US008461800B2

(12) United States Patent
Kozakai

(10) Patent No.: US 8,461,800 B2
(45) Date of Patent: Jun. 11, 2013

(54) CONTACTLESS POWER SUPPLY APPARATUS, CONTACTLESS POWER RECEIVING APPARATUS, AND ASSOCIATED METHODOLOGY OF PRIORITY DISPLAY

(75) Inventor: Osamu Kozakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 12/826,895

(22) Filed: Jun. 30, 2010

(65) Prior Publication Data

US 2011/0018496 A1 Jan. 27, 2011

(30) Foreign Application Priority Data

Jul. 23, 2009 (JP) ................................ 2009-171798

(51) Int. Cl.
*H01M 10/46* (2006.01)

(52) U.S. Cl.
USPC ........................................................ 320/108

(58) Field of Classification Search
USPC ................................ 320/107, 108, 114, 115
See application file for complete search history.

(56) References Cited

U.S. PATENT DOCUMENTS 6,442,434 B1 8/2002 Zarinetchi et al.
8,169,185 B2 * 5/2012 Partovi et al. ................ 320/108
2003/0085684 A1 * 5/2003 Tsukamoto et al. .......... 320/108
2006/0061324 A1 3/2006 Oglesbee
2008/0211458 A1 9/2008 Lawther et al.
2009/0039828 A1 2/2009 Jakubowski
2009/0096413 A1 * 4/2009 Partovi et al. ................ 320/108
2009/0146608 A1 6/2009 Lee

FOREIGN PATENT DOCUMENTS

GB 2 398 176 A 8/2004
JP 2004-207137 7/2004
WO WO 2009/031639 A1 3/2009

OTHER PUBLICATIONS

European Search Report dated Aug. 9, 2012, in European Patent Application No. 10007327.9-2207/2278681, filed Jul. 15, 2010.

* cited by examiner

*Primary Examiner* — Edward Tso
(74) *Attorney, Agent, or Firm* — Oblon, Spivak, McClelland, Maier & Neustadt, L.L.P.

(57) ABSTRACT

A contactless power supply for charging at least one device using magnetic field resonance includes an AC power supply, at least one circuit, a charging surface and at least one indicator to indicate a charging priority relative to the charging surface according to magnetic field strength. Devices placed near a region of the charging surface indicated as having a high priority by the indicators will charge more rapidly than an external device placed near a region of the charging surface indicated by the indicators as having a lower charging priority. Indication of the charging priority regions on the charging surface may be indicated by differing materials, patterns, shapes or offsets. In addition, the contactless power supply may have more than one region of high charging priority.

17 Claims, 10 Drawing Sheets

1
11
AC POWER SUPPLY
12
13
MAGNETIC FIELD RESONANCE
MAGNETIC FIELD RESONANCE
2
21
22
23
RECTIFICATION CIRCUIT
3
31
32
33
RECTIFICATION CIRCUIT

FIG. 12A
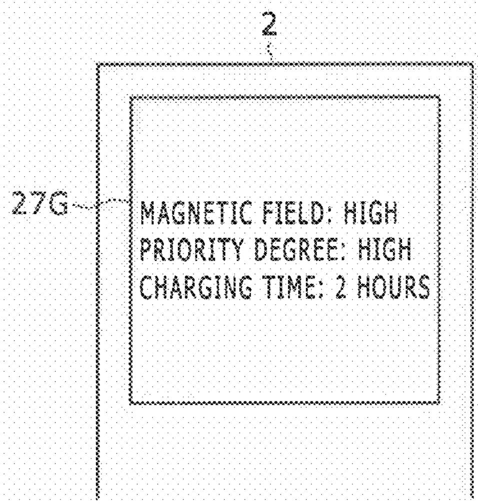
FIG. 12B
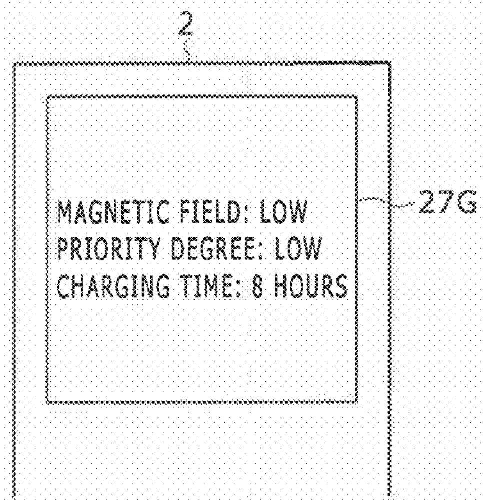
FIG. 13
$$fr = \frac{1}{2\pi\sqrt{L \cdot C}} \quad \cdots (1)$$

200
100
AC POWER SUPPLY
101
102
103
201
202
203
ELECTROMAGNETIC INDUCTION RELATIONSHIP
MAGNETIC FIELD RESONANCE RELATIONSHIP
ELECTROMAGNETIC INDUCTION RELATIONSHIP
RECTIFICATION CIRCUIT
DC OUTPUT

FIG. 16

| | MAGNETIC FIELD RESPONCE TYPE | ELECTROMAGNETIC INDUCTION TYPE |
|---|---|---|
| TRANSMISSION DISTANCE | LONG | SHORT (SUDDENLY ATTENUATES AS DISTANCE INCREASES) |
| DISPLACEMENT BETWEEN TRANSMISSION AND RECEPTION COIL | HIGH EFFICIENCY IS MAINTAINED REGARDLESS OF DISPLACEMENT IN POSITION AND ANGLE | ATTENUATES SUDDENLY |
| FREQUENCY SELECTIVITY | YES | NO |
| 1 TO n POWER SUPPLY | PERMITTED | DIFFICULT (ATTRIBUTABLE TO DISTANCE) |

FIG. 17

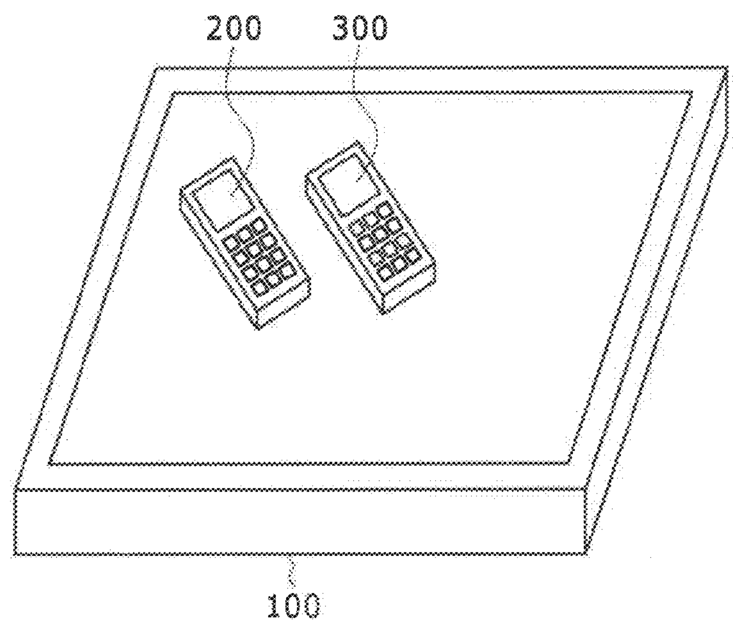

CONTACTLESS POWER SUPPLY APPARATUS, CONTACTLESS POWER RECEIVING APPARATUS, AND ASSOCIATED METHODOLOGY OF PRIORITY DISPLAY

CROSS REFERENCE TO RELATED APPLICATIONS

The present application contains subject matter related to that disclosed in Japanese Priority Patent Application JP 2009-171798 filed in the Japan Patent Office on Jul. 23, 2009, the entire content of which is hereby incorporated by reference.

BACKGROUND

1. Field

This invention relates to a contactless power supply apparatus that emits AC power using a resonance phenomenon such as magnetic field resonance or electric field resonance, a contactless power receiving apparatus for receiving AC power using a resonance phenomenon, and a priority degree displaying method used in the contactless power supply apparatus and the contactless power receiving apparatus.

2. Discussion of the Background

As a technique for allowing transmission of electric energy in a contactless fashion, an electromagnetic induction method and a magnetic field resonance method are available. The electromagnetic induction method and the magnetic field resonance method have such various differences as described below, and in recent years, attention is paid to energy transmission which uses the magnetic field resonance method.

FIG. 14 is a schematic diagram of a configuration of a contactless power supply system of the magnetic field resonance type wherein a power supply source and a power supply object or destination correspond in a one-to-one relationship with respect to each other. Referring to FIG. 14, the contactless power supplying apparatus of the magnetic field resonance type includes a power supply source 100 and a power supply destination 200.

The power supply source 100 may be, for example, a charging cradle and includes an AC (alternative current) power supply 101, an excitation element 102, and a resonance element 103. Meanwhile, the power supply destination 200 may be a portable telephone terminal and includes a resonance element 201, an excitation element 202 and a rectification circuit 203.

Each of the excitation element 102 and the resonance element 103 of the power supply source 100 and the resonance element 201 and the excitation element 202 of the power supply destination 200 is formed from an air-core coil. In the inside of the power supply source 100, the excitation element 102 and the resonance element 103 are coupled strongly to each other by electromagnetic induction. Similarly, in the inside of the power supply destination 200, the resonance element 201 and the excitation element 202 are coupled strongly to each other by electromagnetic induction.

When the self resonance frequencies of the resonance element 103 in the form of an air-core coil of the power supply source 100 and the resonance element 201 in the form of an air-core coil of the power supply destination 200 coincide with each other, the resonance element 103 and the resonance element 201 are placed in a magnetic field resonance relationship, in which the coupling amount is maximum and the loss is minimum.

In particular, the contactless power supply system of FIG. 14 operates in the following manner. First, in the power supply source 100, AC power of a predetermined frequency which is energy of AC current from the AC power supply 101 is supplied to the excitation element 102, in which AC power to the resonance element 103 is induced by electromagnetic induction by the AC power supply 101. Here, the frequency of the AC power generated in the AC power supply 101 is equal to the self-resonance frequencies of the resonance element 103 of the power supply source 100 and the resonance element 201 of the power supply destination 200.

As described hereinabove, the resonance element 103 of the power supply source 100 and the resonance element 201 of the power supply destination 200 are disposed in a relationship of magnetic field resonance. Therefore, with the resonance frequency, AC power, which is energy of AC current or the like, is supplied from the resonance element 103 to the resonance element 201 in a contactless fashion.

In the power supply destination 200, the AC power from the resonance element 103 of the power supply source 100 is accepted by the resonance element 201. The AC power from the resonance element 201 is supplied to the rectification circuit 203 through the excitation element 202 by electromagnetic induction and is converted by the rectification circuit 203 into and outputted as DC (direct current) power.

In this manner, AC power is supplied from the power supply source 100 to the power supply destination 200 in a contactless fashion. It is to be noted that the DC power outputted from the rectification circuit 203 is supplied, for example, to a charging circuit (not shown) to which a battery (not shown) is connected in order to charge the battery.

The contactless power supply system wherein the power supply source 100 and the power supply destination 200 configured in such a manner as described above with reference to FIG. 14 correspond in a one-to-one relationship with respect to each other has the following characteristics.

The contactless power supply system has such a relationship between the frequency of the AC power supply and the coupling amount as in FIG. 15A. In FIG. 15A, even if the frequency of the AC power supply is low or conversely high, the coupling amount is not high but exhibits its maximum amount only at a predetermined frequency with which a magnetic field resonance phenomenon occurs. In other words, the coupling amount exhibits frequency selectivity depending upon the magnetic field resonance.

Further, the relationship between the distance between the resonance elements 103 and 201 and the coupling amount of the contactless power supply system is illustrated in FIG. 15B. In FIG. 15B, the coupling amount decreases as the distance between the resonance elements increases.

However, even if the distance between the resonance elements is small, the coupling amount is not necessarily great, but at a particular resonance frequency, the coupling amount exhibits a maximum value at a particular distance. Further, in FIG. 15B, a coupling amount higher than a fixed level can be assured if the distance between the resonance elements remains within a certain range.

Further, the relationship between the resonance frequency and the distance between the resonance elements with which a maximum coupling amount is obtained in the contactless power supply system is illustrated in FIG. 15C. In FIG. 15C, where the resonance frequency is low, the distance between the resonance elements is great. Also, where the resonance frequency is high, a maximum coupling amount is obtained by decreasing the distance between the resonance elements.

In a contactless power supply system of the electromagnetic induction type which is used widely at present, it is necessary for the power supplying source and the power supplying destination to share magnetic fluxes, and in order to send power efficiently, it is necessary for the power supplying source and the power supplying destination to be disposed closely to each other. Also axial registration of the power supplying source and the power supplying destination to be coupled to each other is significant.

Meanwhile, a contactless power supply system which uses a magnetic field resonance phenomenon is advantageous in that, in the contactless power supply system, power can be transmitted over a greater distance compared to the electromagnetic induction method and even if the axial registration is not very good, the transmission efficiency does not significantly drop.

From the foregoing, the contactless power supply system of the magnetic field resonance type is superior to the contactless power supply system of the electromagnetic induction type for the following reasons. First, the contactless power supply system of the magnetic field resonance type is tolerant of displacement between the transmission and reception coils, which is, between the resonance elements and permits a longer transmission distance.

Therefore, the contactless power supply system of the magnetic field resonance type can carry out power supply as in FIG. 17. In particular, referring to FIG. 17, a plurality of power supply destinations which are portable terminals in FIG. 17 can be placed on a single power supply source which is a power supply cradle in FIG. 17 so that they are charged by the latter.

However, the plural power supply destinations or portable terminals placed on the power supply source or power supply cradle may include a power supply destination which should be charged more rapidly than the other power supply destinations, or a power supply destination which may be charged, for example, before use of the same is started the following day.

As a conventional system which can charge a plurality of power supply destinations in a preferential order in this manner, a battery pack charging adapter of the contact type is disclosed in Japanese Patent Laid-Open No. 2004-207137 (hereinafter referred to as Patent Document 1).

The battery pack charging adapter disclosed in Patent Document 1 can charge a plurality of battery packs at the same time and can include a preferential changeover to apply a priority order for charging to the battery packs connected thereto. However, in the conventional battery pack charging adapter, the electric connection between the charging adapter and the battery packs is established by a contact type connection, and the connection positions of the battery packs to the charging adapter are fixed.

The contactless power supply system of the magnetic field resonance type described hereinabove with reference to FIGS. 13 to 16 carries out contactless charging and has a characteristic that the placement positions of the power supply destinations 200 and 300 with respect to the power supply source 100 in the form of a charger are indefinite as in FIG. 16.

Therefore, in the contactless power supply system of the magnetic field resonance type, it is impossible to determine from its structure, a priority order for supplying power to the object power supply destinations. Further, this ambiguity applies to both a contactless power supply system of the magnetic field resonance type and a contactless power supply system of any other resonance type such as the electric field resonance type.

SUMMARY

From the foregoing, it is desirable to provide a contactless power supply system of the resonance type wherein a priority degree for power supply can be applied to each of apparatus of power supply destinations which receive power supply from a power supply source.

According to an exemplary embodiment of the present invention, a contactless power supply apparatus that emits AC power using magnetic field resonance includes an AC power supply to generate an AC current. The contactless power supply also includes at least on circuit to generate a magnetic field from the AC current generated by the AC power supply, and a charging surface to charge at least one device in physical proximity thereto using magnetic field resonance according to the magnetic field generated by the electromagnetic induction circuit. At least one indicator to indicate a charging priority relative to the charging surface according to a magnetic field strength of the magnetic field is also included in the contactless power supply apparatus.

With the contactless power supplying apparatus, while power is supplied to a device, which is an electronic apparatus of a power supply destination by resonance through the resonance element, priority degrees for power supply are displayed on the charging surface, or the mounting face of the mounting table, to which the electronic apparatus of the power supply destination is proximately located, in accordance with the intensity distribution of energy generated by the resonance element.

In particular, if the electronic apparatus is located relative to a region of the charging surface of the contactless power supplying apparatus in which the distribution of the energy generated by the resonance element is high, then a comparatively great amount of AC power is induced in the device.

In other words, if the device is placed relative to the region of the charging surface of the contactless power supplying apparatus in which the distribution of the energy generated by the resonance element is high, then the device can receive supply of power preferentially from the contactless power supply apparatus.

Thus, priority degrees for power supply are displayed relative to the charging surface of the contactless power supplying apparatus in accordance with the intensity distribution of the energy generated by the resonance element. The display of the priority degrees makes it possible to place an apparatus or external device, which should be supplied with power preferentially, in a region of the charging surface which is displayed as a region having a high priority degree but place another apparatus or device, which may be supplied with power less preferentially, in another region of the charging surface which is displayed as a region having a lower priority degree.

Consequently, a user of devices which are to be supplied with power from the contactless power supplying apparatus can apply a priority degree for power supply to each of the devices. Then, each device to be supplied with power can be supplied with power in accordance with the priority degree applied thereto to carry out charging or the like.

It is to be noted that the term “priority degree for power supply” represents a priority degree for power transmission as viewed from the contactless power supplying apparatus side, that is, from the power supply source side. Accordingly, a user of devices which are power supply destinations to receive supply of power from the contactless power supplying apparatus can apply, to each of the devices which are to receive supply of power, a priority degree of the same where the electronic apparatus should receive supply of power.

Further, the term “priority degree for power supply” represents a priority degree for reception of power supply as viewed from the side of the device, that is, from the contactless power receiving apparatus side. Accordingly, the user of devices which are power supply destinations to receive supply of power from the contactless power supplying apparatus can apply, to each of the devices which are to receive supply of power, a priority degree of the same where the electronic apparatus should receive supply of power.

As used herein a "device" is a device that is not part of the contactless power supply apparatus, and is instead charged by the contactless power supply apparatus.

In another exemplary embodiment of the present invention, a charging system that charges by magnetic field resonance includes a contactless power supply and a device. The contactless power supply includes an AC power supply to generate an AC current, and a circuit to generate a magnetic field based on the AC current. The contactless power supply also includes a charging surface to charge at least one device in physical proximity thereto using magnetic field resonance according to the magnetic field. The device to be charged includes at least one indicator, displayed on a display of the device, to indicate a charging priority relative to the charging surface according to a magnetic field strength of the magnetic field generated by the electromagnetic induction circuit.

In the device, supply of AC power can be received in a contactless fashion from the power supply source through the resonance element, and the AC power can be converted into DC power by the rectification circuit so that it can be used for charging and so forth.

Further, at the preceding stage or the succeeding stage to the rectification circuit, the received power amount by the device is detected, and a priority degree for supplying power to the device itself can be displayed on the device in accordance with the detected received power amount so as to advise a user of the device.

Consequently, the user who observes the priority degree for supplying power to the device displayed on the display section of the device can vary the position of the device relative to the power supplying source so that the priority degree of the device becomes higher or lower. In other words, the priority degree for power supply can be applied for each of the device.

Also in regard to the device, it is considered that the term "priority degree for power supply" represents a priority degree for power transmission as viewed from the device side.

In summary, according to an embodiment of the present invention, in a contactless power supply system of the resonance type, a priority degree for power supply can be applied to each device which should receive supply of power from a power supply source. Consequently, the convenience to a user can be improved, for example, in that any device which should be supplied with power preferentially so as to carry out charging rapidly and any other device which may not be supplied with power preferentially can be supplied with power in an appropriate mode to the device.

BRIEF DESCRIPTION OF THE DRAWINGS

The above and other features and advantages of the present invention will become apparent from the following description and the appended claims, taken in conjunction with the accompanying drawings in which like parts or elements denoted by like reference symbols.

FIG. 12A is a schematic view of a display of information regarding a priority degree for power supply displayed on a display screen of a display section of the power supply destination, or device, according to the third exemplary embodiment of the present invention;

FIG. 12B is another schematic view of display of information regarding a priority degree for power supply displayed on a display screen of a display section of the power supply destination, or device, according to the third exemplary embodiment of the present invention;

FIG. 13 is a mathematical expression for determining a resonance frequency of a resonance element in accordance with exemplary embodiments of the present invention;

FIG. 16 is a table of comparison results between a contactless power supply system of the magnetic field resonance type and a contactless power supply system of the electromagnetic induction type; and FIG. 17 is a schematic diagram of a particular example of a contactless power supply system of the magnetic field resonance type.

DETAILED DESCRIPTION

In the following, apparatus and methods of embodiments of the present invention are described with reference to the accompanying drawings. Although one of ordinary skill in the art would recognize that the present invention can be applied to apparatus and methods of various resonance types such as the magnetic field resonance type, electric field resonance type and electromagnetic induction type, for clarity the following description is provided with regard to apparatus and methods of the magnetic field resonance type.

First Embodiment

[Contactless Power Supply System of the Magnetic Field Resonance Type]

Figure 1:
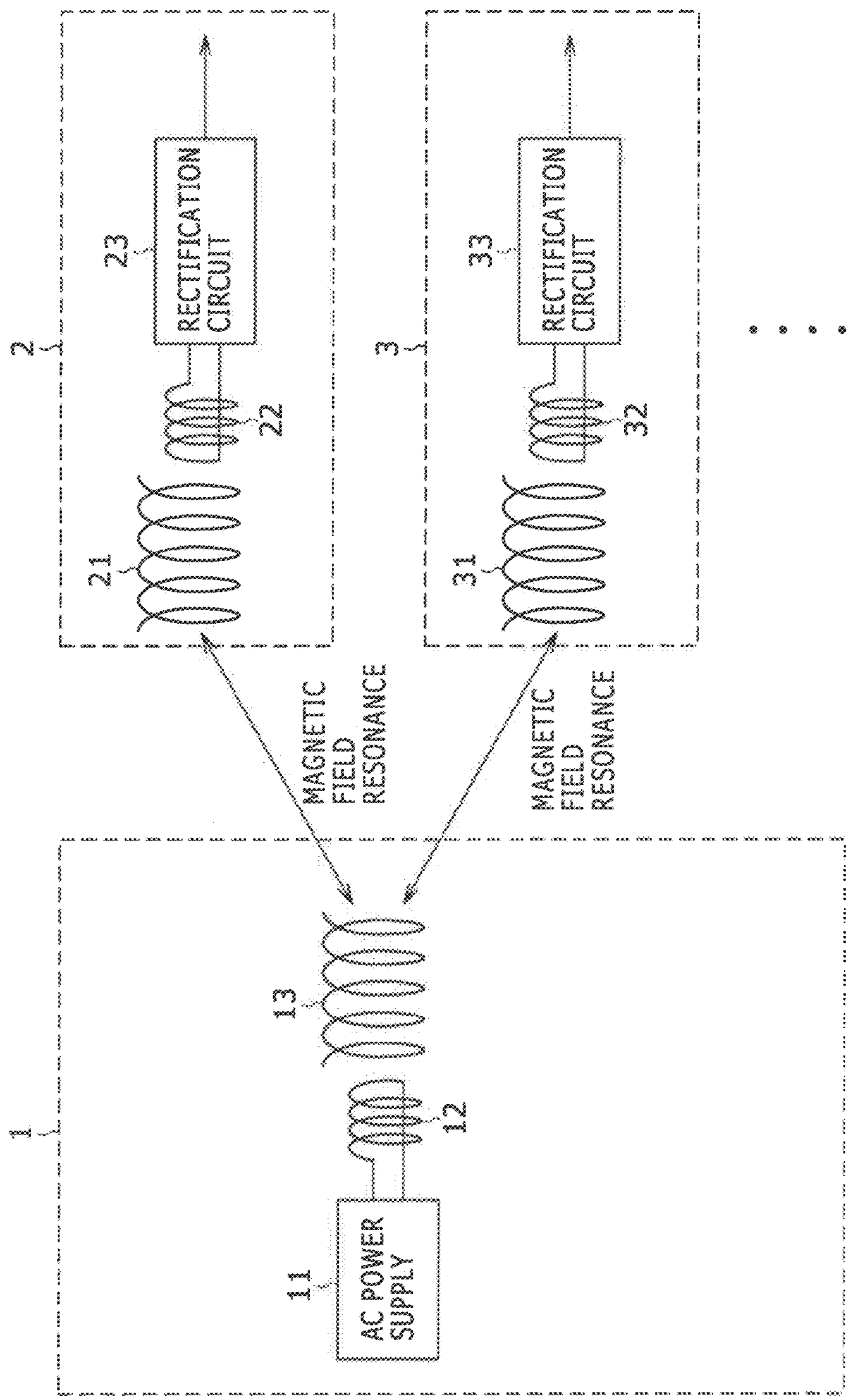
FIG. 1 is a schematic diagram of a configuration of a contactless power supply system of the magnetic field resonance type according to a first exemplary embodiment of the present invention.

FIG. 1 is a schematic diagram of a configuration of a contactless power supply system of the magnetic field resonance type according to the first exemplary embodiment of the present invention. Referring to FIG. 1, the contactless power supply system includes a power supply source 1, and a plurality of power supply destinations 2 and 3.

The power supply source 1 is a contactless power supplying apparatus, which can, for example, be configured as a charging cradle to which an apparatus and a method according to exemplary embodiments of the present invention are applied. The power supply source 1 has a charging surface of a size sufficient to allow a plurality of devices, which become power supply destinations such as portable telephone terminals as described hereinabove with reference to FIG. 17, to be charged based on a proximity thereto. For example, the charging surface may be a mounting table on which the devices are placed.

Each of the devices 2 and 3 is a contactless power supplying apparatus which becomes a power supply destination such as a portable telephone terminal as described hereinabove.

The power supply source 1 includes an AC power supply 11, an excitation element 12 and a resonance element 13. The external device 2 includes a resonance element 21, an excitation element 22 and a rectification circuit 23. Similarly, the device 3 includes a resonance element 31, an excitation element 32 and a rectification circuit 33.

Each of the excitation element 12 and the resonance element 13 of the power supply source 1 is formed from an air-core coil. Also the resonance element 21 and the excitation element 22 of the power supply destination 2 and the resonance element 31 and the excitation element 32 of the device 3 are each formed from an air-core coil.

The AC power supply 11 of the power supply source 1 generates AC power of a frequency equal to or substantially equal to a self-resonance frequency of the resonance element 13 of the power supply source 1, resonance element 21 of the device 2 and resonance element 31 of the device 3 and supplies the generated AC power to the excitation element 12.

In particular, in the contactless power supply system of the magnetic resonance type of FIG. 1, the resonance element 13 of the power supply source 1, resonance element 21 of the device 2 and resonance element 31 of the device 3 have an equal or substantially equal resonance frequency.

Further, the AC power supply 11 of the power supply source 1 includes a Kollwitz type oscillation circuit or a Hartley type oscillation circuit in order to generate AC power of an object frequency such as energy of AC current.

The excitation element 12 is excited by AC power from the AC power supply 11 and supplies the AC power to the resonance element 13. The excitation element 12, which receives supply of the AC power from the AC power supply 11, and the resonance element 13 are coupled strongly by electromagnetic induction.

Therefore, AC power from the AC power supply 11 is supplied to the resonance element 13 through the excitation element 12. It is to be noted that, by establishing impedance matching with the AC power supply 11 and the resonance element 13, the excitation element 12 plays a role also of preventing reflection of an electric signal.

The resonance element 13 generates a magnetic field with AC power supplied thereto from the excitation element 12. The resonance element 13 has inductance and capacitance. The resonance element 13 exhibits the highest magnetic field intensity at a resonance frequency thereof. In this manner, the resonance element 13 generates a magnetic field as energy.

FIG. 13 shows a mathematical expression for determining a resonance frequency fr of the resonance element 13. In the expression (1) of FIG. 13, the character L represents the inductance of the resonance element 13, and the character C represents the capacitance of the resonance element 13.

Accordingly, the resonance frequency of the resonance element 13 depends upon the inductance L and the capacitance C the resonance element 13. Since the resonance element 13 is formed from an air-core coil as described hereinabove, the line-to-line capacitance of the resonance element 13 plays a role as the capacitance. The resonance element 13 generates a magnetic field in an axial direction of the coil.

The resonance element 21 of the device 2 and the resonance element 31 of the device 3 receive supply of AC power from the power supply source 1 by magnetic field coupling by magnetic field resonance. The resonance element 21 of the device 2 and the resonance element 31 of the device 3 have inductance L and capacitance C similarly to the resonance element 13 of the power supply source described hereinabove in connection with the expression (1) of FIG. 13 and have a resonance frequency equal to or substantially equal to that of the resonance element 13 of the power supply source.

Since the resonance element 21 of the device 2 and the resonance element 31 and the device 3 have a configuration of an air-core coil as described hereinabove, the line-to-line capacitance plays a role as the capacitance. The resonance element 21 of the device 2 and the resonance element 31 of the device 3 are connected to the resonance element 13 of the power supply source 1 by magnetic field resonance as in FIG. 1.

Consequently, AC power, that is, energy such as alternating current (AC) current, is supplied by magnetic field resonance from the resonance element 13 of the power supply source 1 to the resonance element 21 of the device 2 and the resonance element 31 of the device 3 at the resonance frequency.

Further, as described hereinabove, in the device 2, the resonance element 21 and the excitation element 22 are coupled to each other by electromagnetic induction, and AC power is supplied from the resonance element 21 to the rectification circuit 23 through the excitation element 22. Similarly, in the device 3, the resonance element 31 and the excitation element 32 are coupled to each other by electromagnetic induction, and AC power is supplied from the resonance element 31 to the rectification circuit 33 through the excitation element 32.

It is to be noted that, by establishing impedance matching with the resonance element 21 and the rectification circuit 23, the excitation element 22 plays a role also of preventing reflection of an electric signal. Similarly, by establishing impedance matching with the resonance element 31 and the rectification circuit 33, the excitation element 32 plays a role also of preventing reflection of an electric signal.

Though not shown, DC power from each of the rectification circuit 23 and the rectification circuit 33 is supplied to a charging circuit to which a battery is connected to charge the battery.

In this manner, in the contactless power supply system of the magnetic field resonance type of the present exemplary embodiment, the device 2 and the device 3 receive supply of power in a contactless fashion from the power supply source 1 and use the power to charge a battery or for some other application.

Where the contactless power supply system of the magnetic field resonance type is configured for one-to-plural power supply such that a plurality of devices 2 and 3 are placed on a single power supply source 1 at the same time so as to receive supply of power, if the number of devices, that is, power receiving apparatus, is increased simply, then the power receiving amount per one power supply destination decreases.

Further, the power supply source 1 of the contactless power supply system of the magnetic field resonance type has a location at which the distribution of a magnetic field generated by the resonance element 13 is strong or high and another location at which the distribution is weak or low.

Thus, if a device is placed near the location of the charging surface of the power supply source 1 at which the distribution of the magnetic field or energy generated by the resonance element 13 is strong or high, then a greater amount of AC power can be induced in the device.

Further, if it is intended to use the power supply source 1 as a charger, then it is not necessarily required to charge all of a plurality of devices or power supplying destinations uniformly. For example, such a situation may occur that, although it is desired for charging of a portable telephone terminal to be completed as early as possible, a portable music reproduction machine may be charged up before tomorrow morning.

Therefore, in the power supply source 1 in the first embodiment, on the charging surface of the power supply source 1 on which the devices 2 and 3 are placed, priority degrees for power supply are displayed or indicated clearly in response to the intensity distribution of a magnetic field generated by the resonance element 13.

Figure 2:
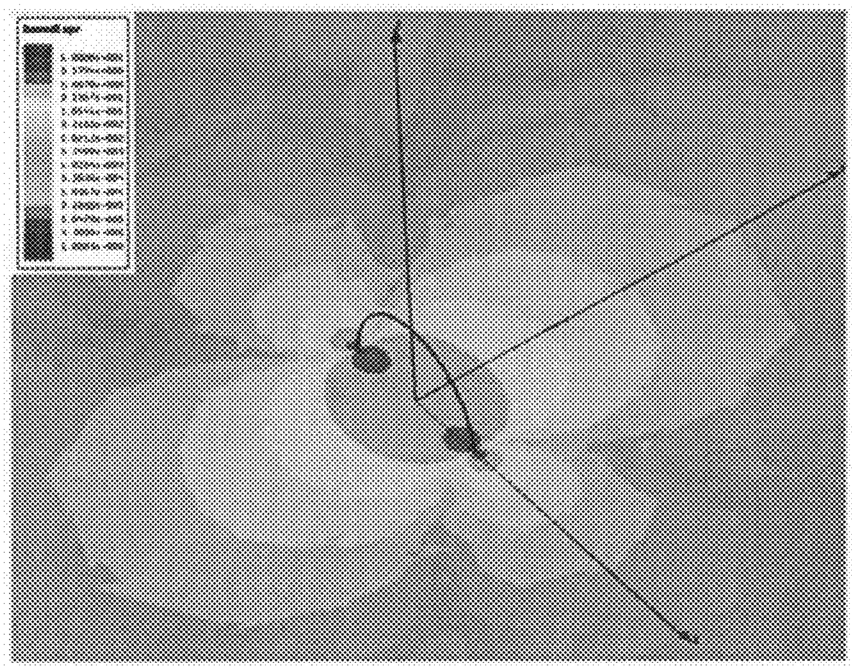
FIG. 2 is a schematic diagram of an intensity distribution of a magnetic field formed on a charging surface of a mounting table of a power supply source by a resonance element in accordance with the first exemplary embodiment of the present invention.

FIG. 2 is an example of the intensity distribution of a magnetic field formed on the charging surface of the power supply source 1 by the resonance element 13 of the power supply source 1 configured in such a manner as described hereinabove with reference to FIG. 1. In the intensity distribution of the magnetic field in FIG. 2, a region in which the intensity distribution of the magnetic field is high or strong exists on the inner side of the resonance element 13 in the form of an air-core coil, and regions in which the intensity distribution of the magnetic field decreases stepwise exist around the region in which the intensity distribution is high.

In the intensity distribution of the magnetic field illustrated in FIG. 2, the intensity distribution of the magnetic field becomes gradually weaker in a direction from the inner side toward the outer side of the resonance element 13 such that, where the charging surface is roughly divided, it has four areas having different intensities of the electric field.

Figure 3:
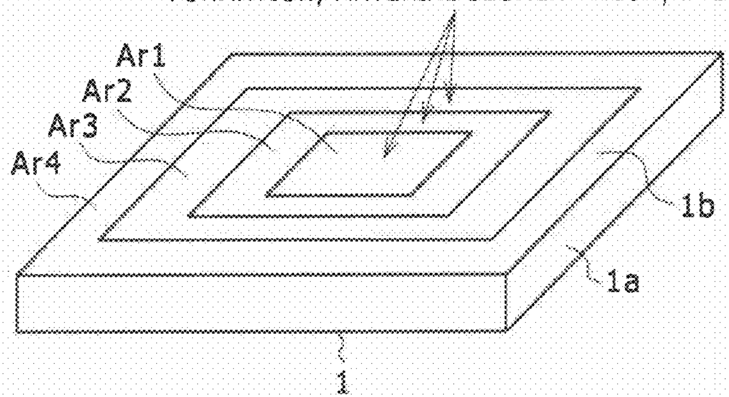
FIG. 3 is a perspective view of a display mode of priority degrees applied to the charging surface of the mounting table of the power supply source in accordance with the first exemplary embodiment of the present invention.
Figure 4:
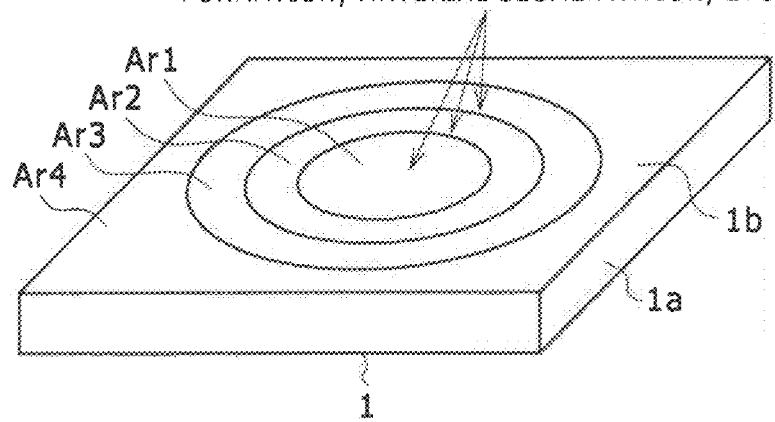
FIG. 4 is perspective view of another display mode of priority degrees applied to the charging surface of the mounting table of the power supply source in accordance with the first exemplary embodiment of the present invention.

FIGS. 3 and 4 are display modes of priority degrees to be applied to the charging surface 1*b* of the mounting table 1*a* of the power supply source 1 where the intensity distribution of the magnetic field of FIG. 2 is generated from the resonance element 13.

In particular, FIG. 3 illustrates the display mode where the areas of different intensity distributions of the magnetic field cut from the intensity distribution of the magnetic field in FIG. 2 are indicated by rectangles on the charging surface 1*b* of the mounting table 1*a* of the power supply source 1. In the display mode illustrated in FIG. 3, four areas are defined by three rectangles on the mounting face 1*b*.

In particular, the power supply source 1 in the first embodiment includes the components thereof as in FIG. 1 provided, for example, in the inside of the mounting table 1*a* in FIG. 3, and the components of the power supply source 1 of FIG. 1 and the mounting table, that is, the charging surface, in FIG. 3 configure the power supply source 1.

The innermost area Ar1 is a region in which the magnetic field intensity of the magnetic field is highest and whose priority degree is highest. Further, the intensity distribution of the magnetic field becomes gradually lower in a direction toward the outer side. In particular, the area Ar2 on the outer side of the innermost area Ar1 has the second highest priority degree, and the area Ar3 on the outer side of the second innermost area Ar2 has the third highest priority degree. Then, the outermost area Ar4 is lowest in intensity distribution of the magnetic field and therefore has the fourth highest priority degree, that is, has the lowest priority degree.

FIG. 4 is a display mode where the areas of different intensity distributions of the magnetic field cut from the intensity distribution of the magnetic field in FIG. 2 are indicated by circles on the charging surface 1*b* of the mounting table 1*a* of the power supply source 1. In the display mode of FIG. 4, four areas are defined by three circles on the charging surface 1*b*.

In particular, the power supply source 1 in the first exemplary embodiment includes the components of FIG. 1 provided, for example, in the inside of the mounting table 1*a* shown in FIG. 3, and the components of the power supply source 1 in FIG. 1 and the mounting table, that is, the charging surface, shown in FIG. 3 configure the power supply source 1.

The innermost circular area Ar1 is a region in which the magnetic field intensity of the magnetic field is highest and whose priority degree is highest. Further, the intensity distribution of the magnetic field becomes gradually lower in a direction toward the outer side. In particular, the area Ar2 on the outer side of the innermost area Ar1 has the second highest priority degree, and the area Ar3 on the outer side of the second innermost area Ar2 has the third highest priority degree. Further, the outermost area Ar4 is lowest in intensity distribution of the magnetic field and therefore has the fourth highest priority degree, that is, has the lowest priority degree.

Thus, a device which should be charged up as rapidly as possible like, for example, a personal digital assistant is placed in the area Ar1 shown in FIG. 3 or 4. Another device which may be charged up in a longer period of time and has a lower priority degree for the power supply is placed in an area other than the area Ar1.

In particular, device having a lower priority degree for the power supply is placed in any of the areas Ar2, Ar3 and Ar4. In this instance, the device may be placed across the area Ar2 and the area Ar3 or across the area Ar3 and the area Ar4.

In this manner, a device can be placed in an area of the charging surface 1*b*, on which the priority degrees corresponding to intensity distributions of a magnetic field generated by the resonance element 13 are displayed, in response to the priority degree thereof for the power supply.

Consequently, where a plurality of devices are placed on the charging surface 1*b* of the mounting table of the power supply source 1, the decrease of the power receiving amount which may occur with the individual devices can be suppressed to the minimum.

Further, a device which has a high priority degree for the power supply may be placed in the area of the charging surface whose intensity distribution of the magnetic field is highest such that it receives supply of power preferentially and is charged up rapidly.

On the other hand, a device which has a low priority degree for the power supply may be placed in an area of the charging surface whose intensity distribution of the magnetic field is lower such that it receives and is charged up by supply of power from the power supply source although the power receiving amount is smaller without disturbing the power supply to the device having a higher priority degree for the power supply.

In this manner, a user of an electronic apparatus such as a personal digital assistant, which may be a device, would set a priority degree for the power supply in response to a mode of use of the device used by the user itself. Then, the user can suitably select a mounting position on the charging surface 1*b* in accordance with the priority degrees displayed on the charging surface 1*b* of the mounting table 1*a* of the power supply source 1 and place the electronic apparatus which becomes the device at the selected place so that the electronic apparatus can receive supply of power in accordance with the priority degree.

Accordingly, since the user of the electronic apparatus such as a personal digital assistant which becomes a device can set a priority degree for the power supply to each device and the electronic apparatus can receive supply of power from the power supply source in accordance with the priority degree, the convenience of the device to the user can be improved.

It is to be noted that the charging surface 1*b* of the mounting table 1*a* of the power supply source 1 can be set to an appropriate size in response to the diameter and the winding number of the resonance element 13 and the intensity distribution of the magnetic field to be generated by the resonance element 13. For example, it is possible to set the size of the charging surface 1*b* of the mounting table 1*a* of the power supply source 1 to a square having a side of 30 cm and form an area Ar1 of the first priority degree having a side of 8 cm at a central location of the square having a side of 30 cm and further form the areas Ar2, Ar3 and Ar4 in such a mode as described hereinabove with reference to FIG. 3 around the area Ar1.

Naturally, it is possible to provide a greater number of areas on the charging surface of the mounting table in response to the diameter and the winding number of the resonance element 13 and the intensity distribution of a magnetic field to be generated by the resonance element 13 or to conversely provide a smaller number of areas on the charging surface of the mounting table.

Second Embodiment

If a plurality of resonance elements are used for a power supply source, then a magnetic field can be generated in a mode different from that where a single resonance element is used. Therefore, in a contactless power supply system according to a second exemplary embodiment of the present invention, two resonance elements are provided in the power supply source.

It is to be noted that, in the contactless power supply system of the second exemplary embodiment, the power supply source is different in configuration from the power supply source 1 in the first embodiment described hereinabove while the devices are not different in configuration. Therefore, also in the following description of the second exemplary embodiment, it is assumed that the devices have a configuration similar to that of the devices 2 and 3 in the first exemplary embodiment described hereinabove with reference to FIG. 1.

First Example

Figure 5:
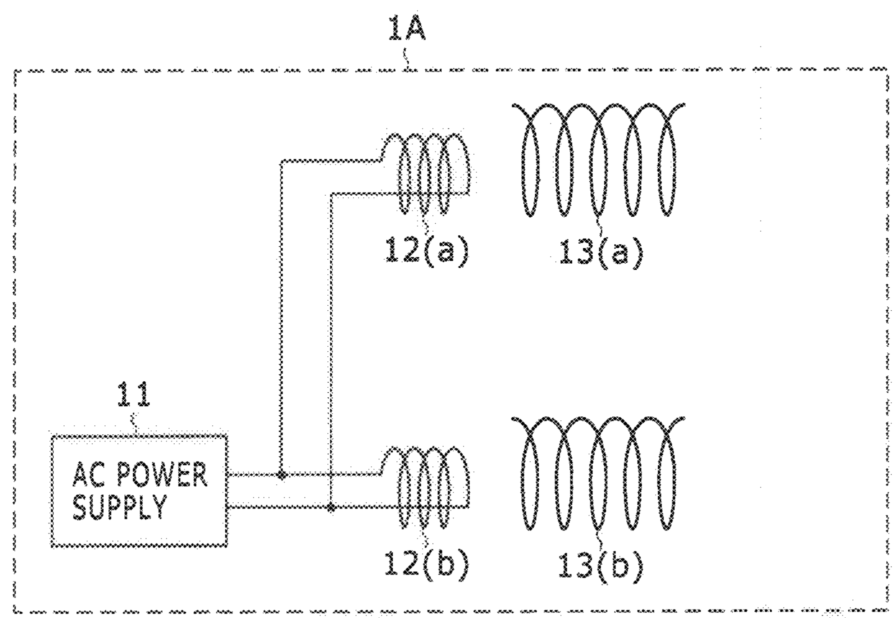
FIG. 5 is a schematic diagram of a power supply source of a contactless power supply system according to a second exemplary embodiment of the present invention.
Figure 6:
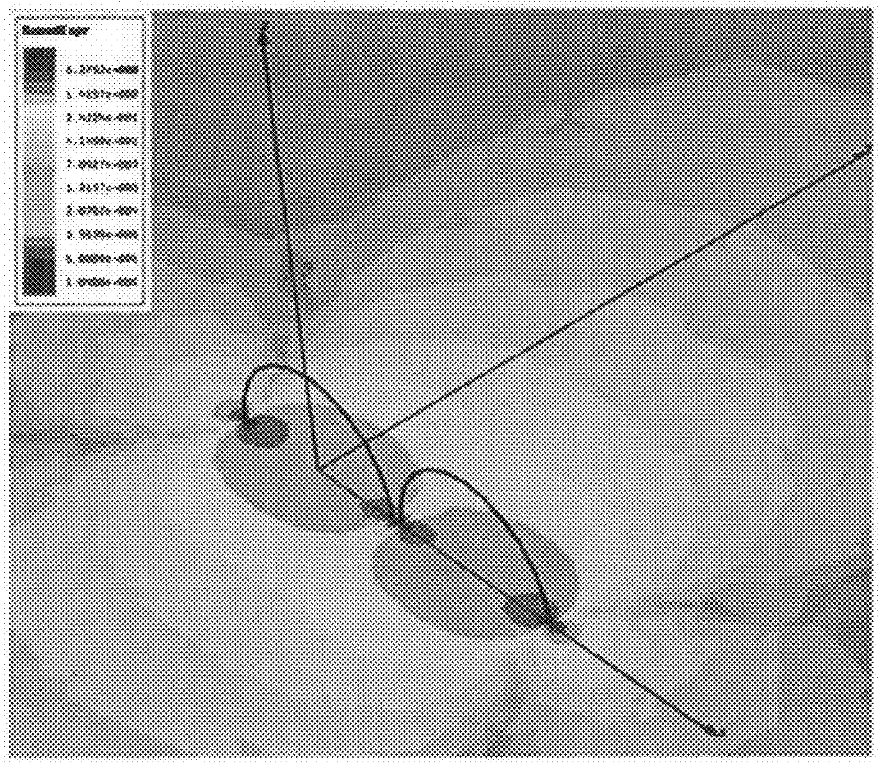
FIG. 6 is a schematic diagram of an intensity distribution of a magnetic field on a charging surface of a mounting table generated by two resonance elements of the power supply source according to the second exemplary embodiment of the present invention.

FIG. 5 is a power supply source 1A of a first example of the second embodiment. FIG. 6 is an intensity distribution of a magnetic field on a charging surface of a mounting table generated by two resonance elements of the power supply source 1A in FIG. 5.

Referring first to FIG. 5, the power supply source 1A in the second exemplary embodiment includes an AC power supply 11, a pair of excitation elements 12(*a*) and 12(*b*), and a pair of resonance elements 13(*a*) and 13(*b*). The excitation element 12(*a*) and the resonance element 13(*a*) form a first power supply path, and the excitation element 12(*b*) and the resonance element 13(*b*) form a second power supply path.

The AC power supply 11 is configured similarly to the AC power supply 11 of the power supply source 1 in the first embodiment. The excitation elements 12(*a*) and 12(*b*) are configured similarly to the excitation element 12 of the power supply source 1 in the first exemplary embodiment. The resonance elements 13(*a*) and 13(*b*) are configured similarly to the resonance element 13 of the power supply source 1 in the first exemplary embodiment.

The AC power supply 11 generates AC power of a frequency equal to or substantially equal to a resonance frequency which the resonance elements 13(*a*) and 13(*b*), the resonance element 21 of the device 2 and the resonance element 31 of the device 3 have, and supplies the generated AC power to the excitation elements 12(*a*) and 12(*b*).

The excitation elements 12(*a*) and 12(*b*) are excited by the AC power from the AC power supply 11 and supply the AC power to the corresponding resonance elements 13(*a*) and 13(*b*), respectively. The excitation elements 12(*a*) and 12(*b*) and the corresponding resonance elements 13(*a*) and 13(*b*) are coupled strongly to each other by electromagnetic induction, respectively.

Therefore, the AC power from the AC power supply 11 is supplied to the resonance elements 13(*a*) and 13(*b*) through the corresponding excitation elements 12(*a*) and 12(*b*). It is to be noted that, by establishing impedance matching with the AC power supply 11 and the corresponding resonance elements 13(*a*) and 13(*b*), the excitation elements 12(*a*) and 12(*b*) play a role also of preventing reflection of an electric signal.

The resonance elements 13(*a*) and 13(*b*) generate a magnetic field or energy with the AC power supplied thereto from the corresponding excitation elements 12(*a*) and 12(*b*), respectively. The resonance elements 13(*a*) and 13(*b*) have inductance and capacitance and exhibit the highest magnetic field intensity at a resonance frequency thereof.

In particular, the resonance frequency fr of the resonance elements 13(*a*) and 13(*b*) can be determined in accordance with the expression (1) in FIG. 13 similarly to that of the resonance element 13 of the power supply source 1 in the first exemplary embodiment.

Since the resonance elements 13(*a*) and 13(*b*) have a configuration of an air-core coil similarly to the resonance element 13 in the first exemplary embodiment, they generate a magnetic field in an axial direction of the coil thereof with AC power from the corresponding resonance elements 13(*a*) and 13(*b*), respectively.

Consequently, the AC power can be supplied to the resonance element of each power supply destination, or device such as the device 2 or the device 3 by electromagnetic coupling by magnetic field resonance.

Thus, such an intensity distribution of the magnetic field as in FIG. 6 is formed on the charging surface of the mounting table by the resonance elements 13(*a*) and 13(*b*) of the power supply source 1A having the configuration described hereinabove with reference to FIG. 5. In this instance, a region in which the intensity distribution of the magnetic field is strong is formed at each of portions of the charging surface of the mounting table which correspond to the inner side of the resonance elements 13(*a*) and 13(*b*).

In particular, two regions in which the intensity distribution of the magnetic field is strong are formed corresponding to the two resonance elements 13(*a*) and 13(*b*) as in FIG. 6, and regions in which the intensity distribution of the magnetic field become weaker stepwise are formed around the two regions.

In the first example of the second exemplary embodiment, AC power from the AC power supply 11 is supplied to the excitation elements 12(*a*) and 12(*b*). Therefore, magnetic fields generated from the resonance elements 13(*a*) and 13(*b*) exhibit AC powers of the same phase and the same amplitude.

Further, priority degrees for power supply are disposed on the charging surface of the mounting table of the power supply source 1A in response to the intensity distribution of the magnetic field in FIG. 6. In particular, in the power supply source 1A of the first example of the second exemplary embodiment, the components of the power supply source 1A in FIG. 5 are provided in a mounting table 1*a* hereinafter described.

It is to be noted that a particular mode of display of priority degrees in this instance is described particularly after an example of a configuration of a second example wherein two regions having a high intensity distribution of a magnetic field are formed similarly as in the first example described above is described.

Second Example

Now, a second example of the second exemplary embodiment is described. In the second example, two regions in which the intensity distribution of a magnetic field is high are formed similarly as in the case of the first example described hereinabove with reference to FIGS. 5 and 6.

Figure 7:
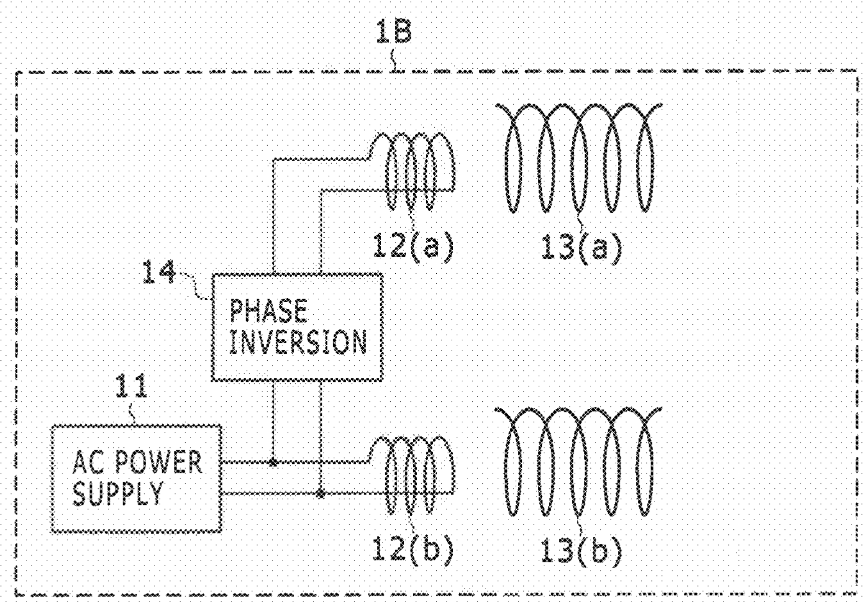
FIG. 7 is a schematic diagram of another power supply source of a contactless power supply system according to the second exemplary embodiment of the present invention.
Figure 8:
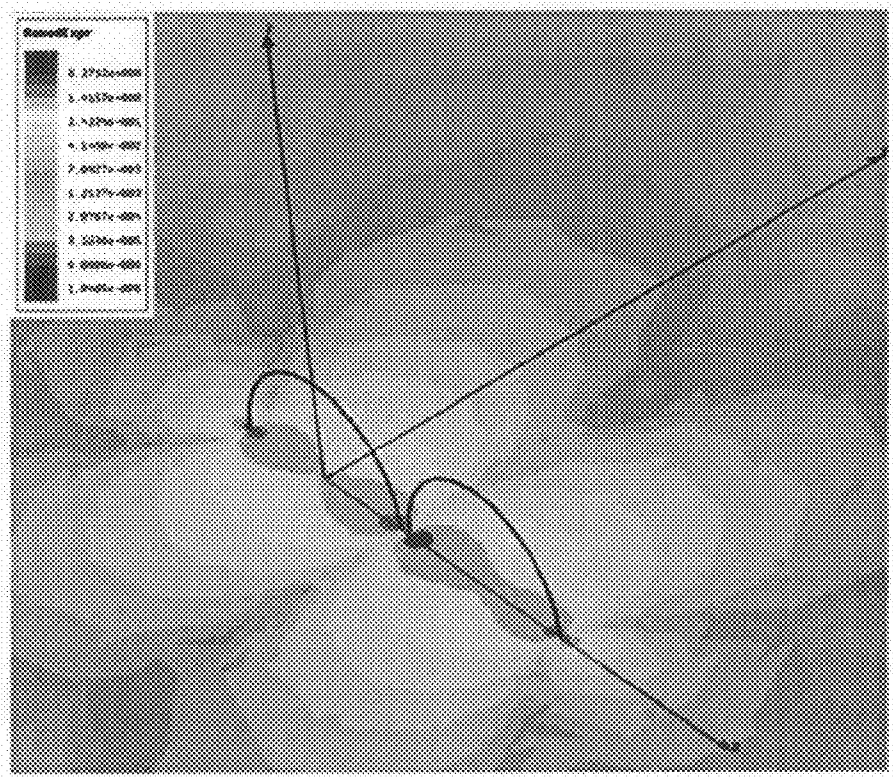
FIG. 8 is a schematic diagram of an intensity distribution of a magnetic field on a charging surface of a mounting table generated by two resonance elements of the other power supply source according to the second exemplary embodiment of the present invention.

FIG. 7 is a power supply source 1B of a contactless power supply system of the second example of the second exemplary embodiment. FIG. 8 is an intensity distribution of a magnetic field on the charging surface of the mounting table generated by two resonance elements of the power supply source 1B in FIG. 7.

With reference to FIGS. 7 and 5, the power supply source 1B of the second example is configured similarly to the power supply source 1A of the first example in FIG. 5 except that a phase inversion section 14 is provided between the AC power supply 11 and the excitation element 12(*a*).

Therefore, overlapping description of the common configuration of the power supply source 1B of the second example in FIG. 7 to that of the power supply source 1A of the first example shown in FIG. 5 is omitted herein to avoid redundancy.

In the power supply source 1B of the second example in FIG. 7, AC power from the AC power supply 11 is supplied as it is to the resonance element 13(*b*). In contrast, to the resonance element 13(*a*), the AC power from the AC power supply 11 is supplied through the phase inversion section 14.

The phase inversion section 14 inverts the phase of the AC power supplied thereto and outputs the AC power of the inverted phase. Consequently, to the resonance element 13(*a*) and the resonance element 13(*b*), AC powers which have phases reverse to each other but have the same amplitude are supplied.

Such an intensity distribution of a magnetic field as in FIG. 8 is formed on the charging surface of the mounting table by the resonance elements 13(*a*) and 13(*b*) of the power supply source 1B having the configuration described above with reference to FIG. 7. In this instance, a region in which the intensity distribution of the magnetic field is high is formed at portions of the charging surface of the mounting table which correspond to the inner side of the resonance elements 13(*a*) and 13(*b*).

In particular, also in the case of the second example, two regions in which the intensity distribution of the magnetic field is high are formed corresponding to the resonance elements 13(*a*) and 13(*b*) as in FIG. 8. Further, in the second example, regions in which the intensity distribution of the magnetic field becomes weaker stepwise are formed around the two regions in which the intensity distribution of the magnetic field is high.

Further, priority degrees for power supply are displayed on the charging surface of the mounting table of the power supply source 1B in response to the intensity distribution of the magnetic field in FIG. 8. In particular, in the power supply source 1B of the second example of the second exemplary embodiment, the components of the power supply source 1B shown in FIG. 7 are provided in the inside of the mounting table 1*a* hereinafter described.

[Display Mode of Priority Degrees for Power Supply in the First and Second Examples]

As can be recognized from comparison between the intensity distribution of the magnetic field in the first example described hereinabove with reference to FIG. 6 and the intensity distribution of the magnetic field in the second example described hereinabove with reference to FIG. 8, in both of the power supply source 1A of the first example and the power supply source 1B of the second example, two regions in which the intensity distribution of a magnetic field is high are formed as described hereinabove.

Further, in the first example in FIG. 6, AC powers of the same phase and the same amplitude are supplied to the resonance elements 13(*a*) and 13(*b*) as described hereinabove. Therefore, regions in which the intensity distribution of the magnetic field becomes gradually lower are formed in such a manner as to be common to each other around the resonance elements 13(*a*) and 13(*b*).

In contrast, in the second example shown in FIG. 8, AC powers which have phases reverse to each other but have the same amplitude are supplied to the resonance elements 13(*a*) and 13(*b*) as described hereinabove. Therefore, for each of the resonance elements 13(*a*) and 13(*b*), regions in which the intensity distribution of the magnetic field becomes lower stepwise are formed.

Figure 9:
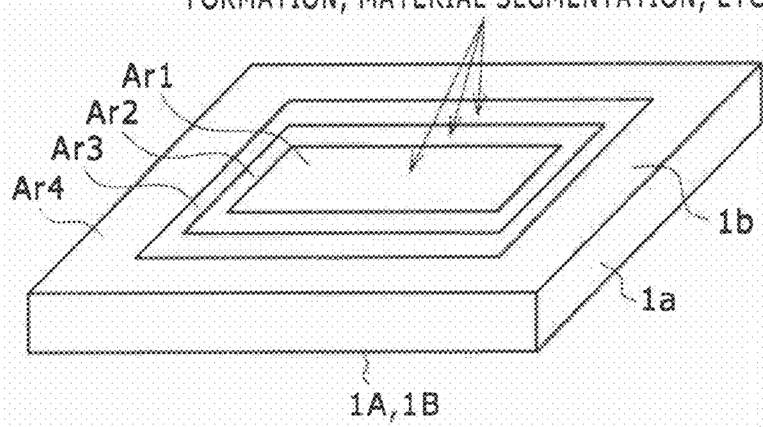
FIG. 9 is a perspective view of a display mode of the priority degrees applied to the charging surface of the mounting table of the other power supply source according to the second exemplary embodiment of the present invention.
Figure 10:
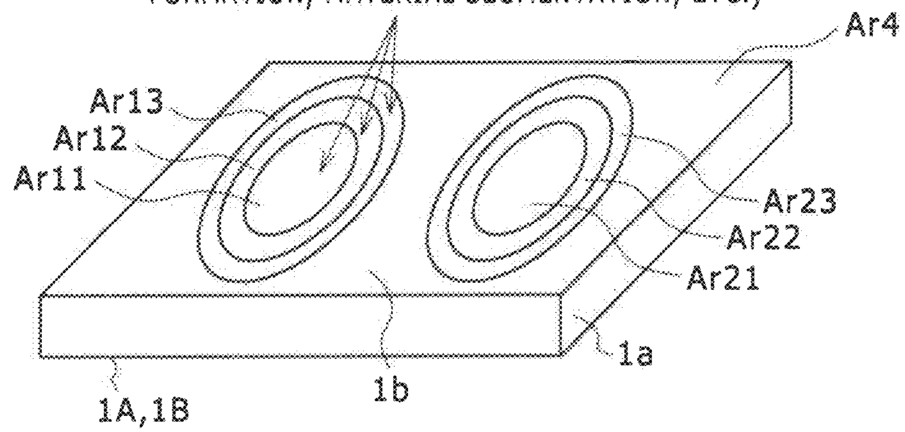
FIG. 10 is a perspective view of another display mode of priority degrees applied to the charging surface of the mounting table of the other power supply source according to the second exemplary embodiment of the present invention.

Thus, the power supply sources 1A and 1B of the first and second examples of the second exemplary embodiment in which an intensity distribution of a magnetic field is formed as in FIGS. 6 and 8 display such priority degrees for power supply as in FIGS. 9 and 10.

FIGS. 9 and 10 are examples of the display mode of priority degrees to be applied to the charging surface 1*b* of the mounting table 1*a* of the power supply sources 1A and 1B in the first and second examples of the second exemplary embodiment.

In particular, FIG. 9 is an example where areas defined in accordance with the intensity distribution of the magnetic field and having different intensity distributions of a magnetic field in FIGS. 6 and 8 are indicated by rectangles on the charging surface 1*b* of the mounting table 1*a* of the power supply source 1. In the example in FIG. 9, four areas are defined by three rectangles on the charging surface 1*b*.

The innermost area Ar1 is a region in which the magnetic field intensity of the magnetic field is highest and whose priority degree is highest. Further, the intensity distribution of the magnetic field becomes gradually lower in a direction toward the outer side. In particular, the area Ar2 on the outer side of the innermost area Ar1 has the second highest priority degree, and the area Ar3 on the outer side of the second innermost area Ar2 has the third highest priority degree. Then, the outermost area Ar4 is lowest in intensity distribution of the magnetic field and therefore has the fourth highest priority degree, that is, has the lowest priority degree.

In this manner, in the example of FIG. 9, priority degrees for power supply are displayed by transversely elongated rectangles in response to the intensity distribution of the magnetic field in FIGS. 6 and 8.

FIG. 10 is a display mode where the areas of different intensity distributions of the magnetic field cut from the intensity distribution of the magnetic field in FIG. 2 are indicated by circles on the charging surface 1*b* of the mounting table 1*a* of the power supply source 1.

In the example shown in FIG. 10, seven areas are defined by two sets of three circles on the charging surface 1*b*. It is to be noted that the components of the power supply source 1A or 1B in FIG. 5 or 7 are provided on the inner side of the mounting table 1*a* in FIG. 10.

The innermost circular areas Ar11 and Ar21 in the two sets of circuits exhibit the highest intensity distribution of a magnetic field and therefore have the first priority degree. Further, the intensity distribution of the magnetic field becomes gradually lower in a direction toward the outer side, and the areas Ar12 and Ar22 on the outer side of the innermost areas Ar11 and Ar21 have the second highest priority degree and the areas Ar13 and AR23 on the outer side of the second innermost areas Ar12 and Ar22 have the third highest priority degree. Further, the outermost area Ar4 is lowest in intensity distribution of the magnetic field and therefore has the fourth highest priority degree, that is, has the lowest priority degree.

Further, not only the power supply source 1A in the first example but also the power supply source 1B of the second example can display priority degrees for power supply as in FIGS. 9 and 10. However, in the case of the power supply source 1A of the first example, priority degrees for power supply are displayed in the mode of FIG. 9 while, in the case of the power supply source 1B of the second example, priority degrees for power supply are displayed in the mode of FIG. 10 to thus provide display of priority degrees in accordance with the intensity distributions of the magnetic fields in FIGS. 6 and 8, respectively.

Where a power supply source on which priority degrees for power supply are displayed in the mode of FIG. 9, a device which should be charged up as rapidly as possible like, for example, a personal digital assistant is placed in the area Ar1 of FIG. 9. Another device which may be charged up in a longer period of time and has a lower priority degree for the power supply is placed in an area other than the area Ar1.

In particular, a device having a lower priority degree for the power supply is placed in any of the areas Ar2, Ar3 and Ar4. In this instance, the device may be placed across the area Ar2 and the area Ar3 or across the area Ar3 and the area Ar4.

Where a power supply source on which priority degrees for power supply are displayed in the mode of FIG. 10, a device which should be charged up as rapidly as possible like, for example, a personal digital assistant is placed in the area Ar11 or Ar21 in FIG. 10. Another device which may be charged up in a longer period of time and has a lower priority degree for the power supply is placed in an area other than the areas Ar11 and Ar21.

In particular, a device having a lower priority degree for the power supply is placed in one of the areas Ar12, Ar13, Ar22, Ar23 and Ar4. In this instance, the device may be placed across the area Ar12 and the area Ar13 or across the area Ar13 and the area Ar4. Similarly, the device may be placed across the area Ar22 and the area Ar23 or across the area Ar23 and the area Ar4.

In this manner, also in the second exemplary embodiment described above, a device can be placed in an area of the charging surface 1*b*, on which priority degrees in accordance with an intensity distribution of magnetic fields generated by the resonance elements 13(*a*) and 13(*b*) are displayed, in accordance with a priority degree thereof for power supply.

Further, a device which has a high priority degree for the power supply may be placed in the area of the charging surface whose intensity distribution of the magnetic field is highest such that it receives supply of power preferentially and is charged up rapidly.

On the other hand, a device which has a low priority degree for the power supply may be placed in an area of the charging surface whose intensity distribution of the magnetic field is lower such that it receives and is charged up by supply of power from the power supply source although the power receiving amount is smaller without disturbing the power supply to the device having a higher priority degree for the power supply.

In this manner, a user of an electronic apparatus such as a personal digital assistant which becomes the device would set a priority degree for power supply in response to a mode of use of the device used by the user itself. Then, the user can place the device near the charging surface so that the electronic apparatus can receive supply of power in accordance with the priority degree.

Accordingly, since the user of the electronic apparatus such as a personal digital assistant which becomes the device can set a priority degree for the power supply to each power supply destination and the electronic apparatus can receive supply of power from the power supply source in accordance with the priority degree, the convenience of the device to the user can be improved.

Further, in the second exemplary embodiment, since the power supply sources 1A and 1B are configured such that they have a plurality of resonance elements, they can be used properly and decrease of the power receiving amount where a plurality of devices are involved can be prevented efficiently.

As one of ordinary skill in the art would recognize, the number of resonance elements in the power supply source is not limited to two but may be set a suitable number greater than two. Further, while it is described that the power supply sources 1A and 1B in FIGS. 5 and 7 include a single AC power supply circuit 11, one AC power supply circuit may be provided for each of excitation elements provided.

Further, also in the second exemplary embodiment, the size of the charging surface 1*b* of the mounting table 1*a* of the power supply sources 1A and 1B can be set suitably in accordance with the number, arrangement position, diameter and winding number of resonance elements, the intensity distribution of magnetic fields to be generated by the resonance elements and so forth.

Naturally, it is possible to provide a greater number of areas on the charging surface of the mounting table or provide a smaller number of areas on the charging surface of the mounting table in accordance with the diameter and the winding number of the resonance elements 13 and the intensity distribution of magnetic fields to be generated by the resonance elements 13.

[Variations of the Display Mode of Priority Degrees for Power Supply on the Charging Surface of the Mounting Table of the Power Supply Source]

The display of priority degrees for power supply carried out on the charging surface of the mounting table of the power supply source is not limited to that implemented by line segmentation by rectangles or circles, that is, by segmentation of an area by drawn lines as described hereinabove with reference to FIGS. 3, 4, 9 and 10.

Areas having different priority degrees for power supply may be displayed or indicated clearly by color segmentation, pattern segmentation, character display, offset formation, material segmentation or the like as in FIGS. 3, 4, 9 and 10.

In one example where color segmentation is used to display areas having different priority degrees for power supply, the color is changed from red→orange→yellow→yellowish green in correspondence to a shift from a region having a high intensity distribution of a magnetic field generated by a resonance element toward another region having a lower intensity distribution of the magnetic field.

In another example where color segmentation is used to display areas having different priority degrees for power supply, the color is changed such that similar colors having successively decreasing depths are applied to regions having successively decreasing intensity distributions of a magnetic field generated by a resonance element. Naturally, different colors of different depths may be applied to the different areas without departing from the scope of the present invention.

In this manner, it is possible to display priority degrees for power supply on the charging surface through color display such that a device can be placed in a suitable area on the charging surface.

Meanwhile, in an example where pattern segmentation is used to display areas having different priority degrees for power supply, different patterns are applied to areas corresponding to regions among which the intensity distribution of the magnetic field generated by a resonance element is different.

For example, the areas are displayed in response to the intensity distribution of a magnetic field such that the figure is changed from a circle→a hexagon→a quadrangle→a triangle in correspondence to a shift from a region having a high intensity distribution of a magnetic field generated by a resonance element toward another region having a lower intensity distribution of the magnetic field.

Alternatively, a predetermined pattern is displayed in the areas in response to the intensity distribution of a magnetic field such that the size thereof is varied in response to the intensity distribution of the magnetic field. In this instance, not only the size or fineness of the pattern but also the pattern itself may be varied.

The pattern may also be drawn using various coating materials or may be applied by forming scratches or forming irregularity on the mounting face. Edging may also be applied using various methods to form patterns.

Further, regarding the character display, a priority degree may be displayed, such as "most preferential, preferential, not preferential," "high, middle, low," "high speed, middle speed, low speed," or "first priority degree, second priority degree, . . . " together with line segmentation, color segmentation or pattern segmentation. Naturally one of ordinary skill in the art would recognize that any number of other characters may be used to display priority degrees without departing from the scope of the present invention.

Meanwhile, according to the offset formation, the charging surface of the mounting table is worked such that an offset is provided between each adjacent ones of the areas in accordance with the intensity distribution of the magnetic field. For example, in FIGS. 3 and 4, the mounting face of the mounting table is worked such that the area Ar1 is formed higher than the surrounding region and the areas Ar2, Ar3 and Ar4 around the area Ar1 are formed successively lower than the area Ar1.

Meanwhile, according to the material segmentation, different materials are used individually for the areas segmented in accordance with the intensity distribution of the magnetic field to form the charging surface or films or the like of different materials are adhered individually to the areas. For example, an acrylic plate, a wood plate, a cloth piece, a felt piece, a paper piece and so forth are selectively used for the areas segmented in accordance with the intensity distribution of the magnetic field to display priority degrees for power supply.

Also with regard to the line segmentation, not only lines of rectangles or circles are drawn, but also portions indicated by rectangles or circles in FIG. 3, 4, 9 or 10 are swollen or conversely recessed to display areas in accordance with the intensity distribution of the magnetic field to display priority degrees for power supply.

Further, the above described color segmentation, pattern segmentation, line segmentation, character display, offset formation, material segmentation and so forth may be used singly or in combination.

Third Embodiment

In the first and second embodiments described above, priority degrees for power supply are displayed on the charging surface of the mounting table of the power supply source. In a third exemplary embodiment, the device is configured such that it can display or advise priority degrees for power supply at present to the user.

Figure 11:
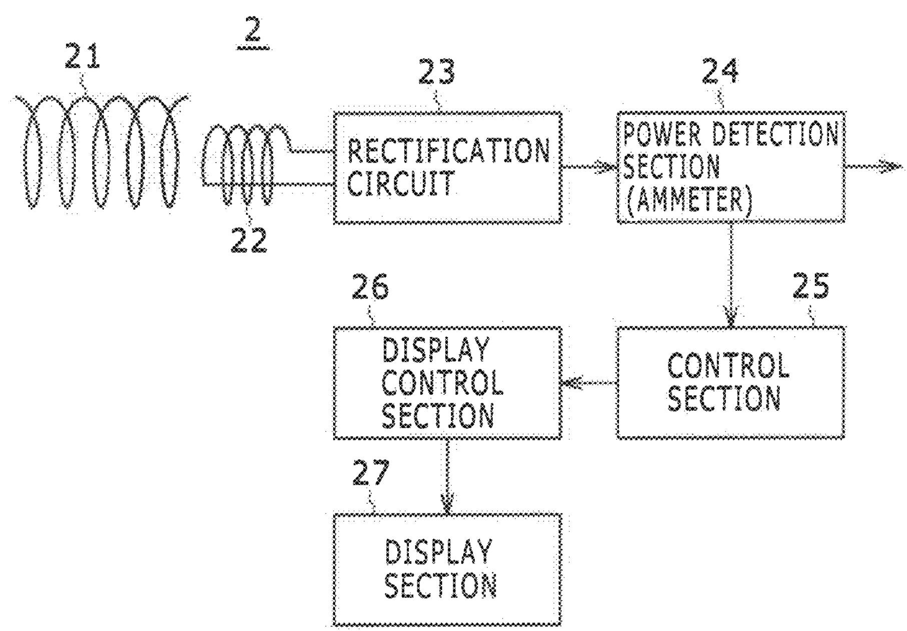
FIG. 11 is a block diagram of a configuration of a power supply destination of a contactless power supply system according to a third exemplary embodiment of the present invention.
Figure 14:
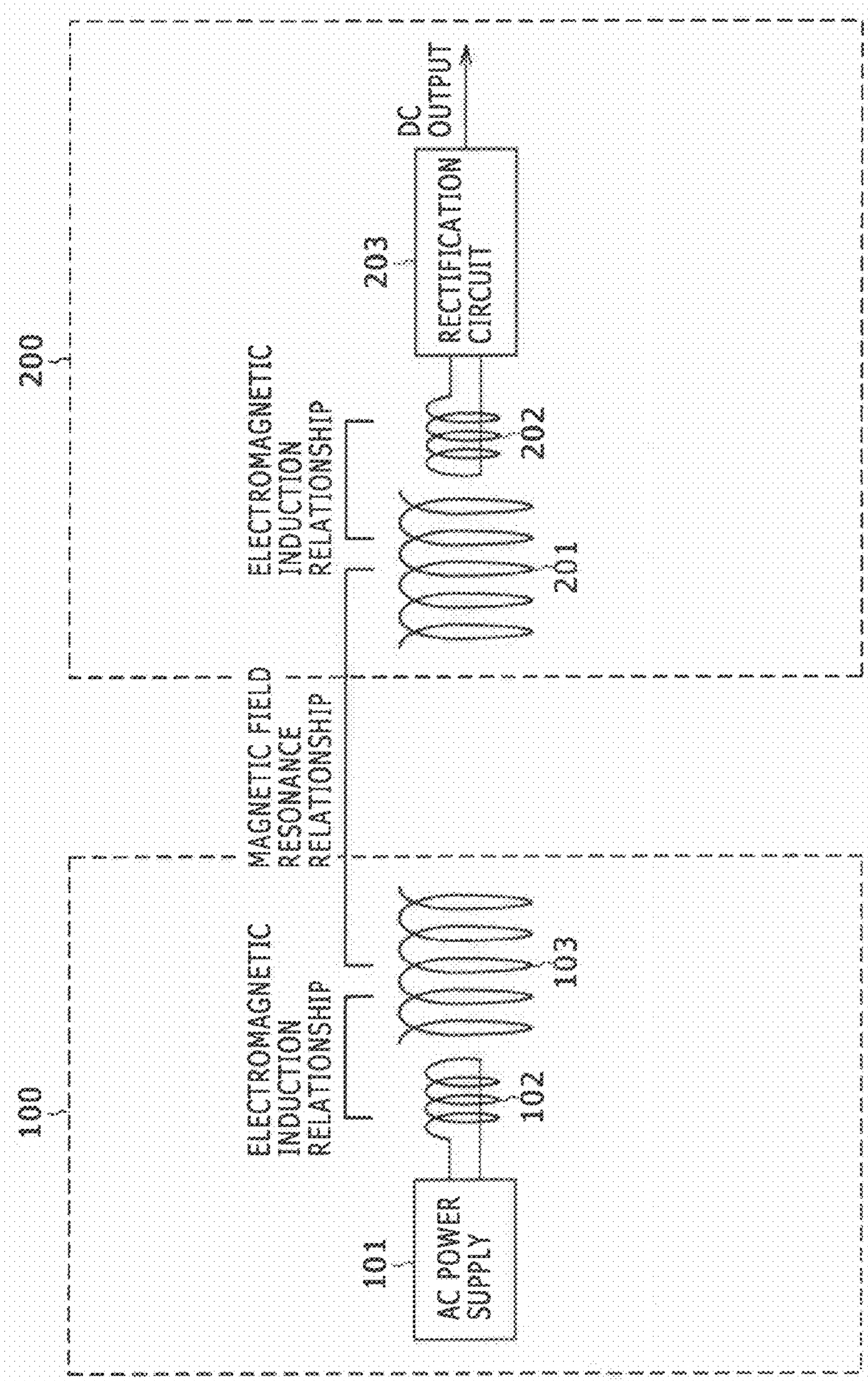
FIG. 14 is a schematic diagram of a conventional contactless power supply system of the magnetic field resonance type.
Figure 15A:
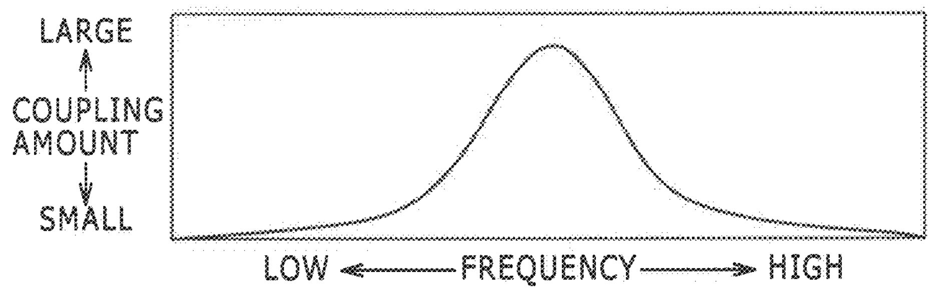
FIG. 15A is a graph of characteristics of a contactless power supply system of the magnetic field resonance type.
Figure 15B:
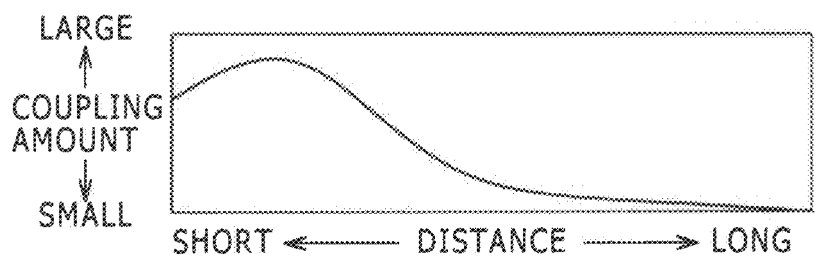
FIG. 15B is a graph of other characteristics of a contactless power supply system of the magnetic field resonance type.
Figure 15C:
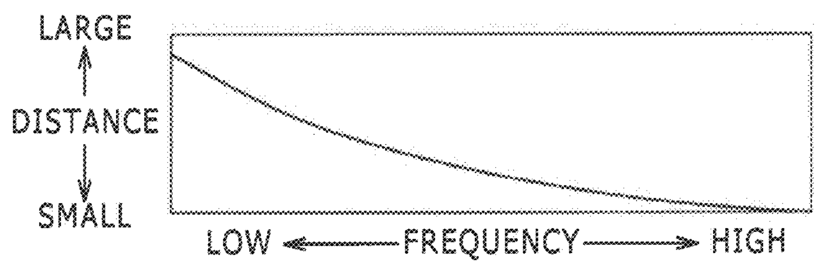
FIG. 15C is a graph of further characteristics of a contactless power supply system of the magnetic field resonance type.

FIG. 11 is an example of a configuration of the device 2 in the third embodiment wherein the contactless power supplying apparatus according to the third embodiment of the present invention is applied to the device 2 described hereinabove with reference to FIG. 1.

It is to be noted that, while, in the third embodiment, the configuration of the devices is different from that in the first embodiment as hereinafter described, the power supply source has the same configuration. Therefore, also the description of the present third embodiment is given assuming that the power supply source has a configuration similar to that of the power supply source 1 in the first embodiment described hereinabove with reference to FIG. 1.

[Example of the Configuration of the External Device 2 in the Third Embodiment]

Referring to FIG. 11, the device 2 of the third embodiment includes a resonance element 21, an excitation element 22, a rectification circuit 23, a power detection section 24, a control section 25, a display control section 26 and a display section 27.

The resonance element 21, excitation element 22 and rectification circuit 23 are configured similarly to the resonance element 21, excitation element 22 and rectification circuit 23 of the device 2 described hereinabove with reference to FIG. 1, respectively. Therefore, overlapping description of them is omitted herein to avoid redundancy.

In the device 2 in the third embodiment, AC power from the rectification circuit 23 is supplied to circuit sections at the succeeding stages through the power detection section 24. The power detection section 24 is, in the present example, an ammeter and detects a current value of DC power from the rectification circuit, that is, a current value or magnitude of DC current. The detected magnitude of the DC power is supplied to the control section 25.

In particular, the power detection section 24 detects a current value of DC power formed from AC power induced in the resonance element 21 connected to the resonance element 13 of the power supply source 1 by magnetic field resonance. Accordingly, if the intensity of the magnetic field from the power supply source 1 is low, then the current value of DC power formed in the power supply destination is low, but conversely if the intensity of the magnetic field from the power supply source 1 is high, then the current value of the DC power formed in the power supply destination is high.

The control section 25 is, through not shown, a microcomputer wherein a CPU (Central Processing Unit), a ROM (Read Only Memory), a RAM (Random Access Memory) and a nonvolatile memory are connected to each other by a CPU bus.

In the nonvolatile memory of the control section 25, a priority degree table is formed wherein current values of DC power formed by the rectification circuit 23, intensities of a magnetic field from the power supply source 1, priority degrees for power supply and charging time periods, that is, time periods required for charging up, are associated with each other.

The priority degree table makes allows determination of, when the current value of DC power formed by the rectification circuit 23 is a certain ampere value, the intensity of the magnetic field from the power supply source 1, the corresponding priority degree and the time period required for charging.

The control section 25 refers to the priority degree table of the nonvolatile memory based on the current value of DC power from the power detection section 24 to extract information representative of the intensity of the magnetic field, the priority degree for power supply and the charging time at the current point of time. Then, the control section 25 supplies the extracted information to the display control section 26.

The display control section 26 forms display information to be displayed on the display screen of the display section 27 based on the information supplied thereto from the control section 25 and supplies the formed display information to the display section 27.

The display section 27 is formed from a slim type display unit such as an LCD (Liquid Crystal Display) panel or an organic EL panel (Organic Electroluminescence Panel). The display section 27 is controlled by the display control section 26 and displays the information representative of the intensity of the magnetic field, the priority degree for power supply and the charging time from the power supply source 1 at the current point of time on a display screen 27G of the display section 27 itself.

FIGS. 12A and 12B are examples of display of information regarding the priority degree for power supply displayed on the display screen 27G of the display section 27 of the device 2 in the third embodiment.

If the current value of the DC power detected by the power detection section 24 is high and the information read out from the priority degree table based on the current value is that the magnetic field from the power supply source 1 is "high" and the priority degree is "high" and the charging time is "two hours," then such a screen image as in FIG. 12A is displayed.

On the other hand, if the current value of the DC current detected by the power detection section 24 is low and the information read out from the priority degree table based on the current value is such that the magnetic field from the power supply source 1 is "low" and the priority degree is "low" and besides the charging time is "eight hours," then such a display screen image as in FIG. 12B is displayed.

FIGS. 12A and 123 are merely exemplary, and other displays are possible. For example, it is possible to display only a priority degree in such a character as "high," "middle" or "low" or indicate a priority degree for power supply as a color or a number of figures of a star or the like.

If a user confirms the display image in FIG. 12A or 123 and wants to lower the priority degree for power supply from the current value, then the user can search for a position at which the priority degree decreases from the current value on the charging surface of the mounting table of the power supply source 1 and move the device to the position.

On the other hand, if the user confirms the display image in FIG. 12A or 12B and wants to raise the priority degree for power supply from the current value, the user can search for a position at which the priority degree rises from the current value on the charging surface of the mounting table of the power supply source 1 and move the device to the position.

In particular, the information displayed on the display screen 27G of the display section 27 of the power supply destination 2 can be varied on the real time basis by moving the device 2 on the charging surface of the mounting table of the power supply source 1. Consequently, the variation of the placed position of the device 2 in accordance with the information displayed on the display screen 27G can be carried out suitably.

Consequently, a user of an electronic apparatus such as a personal digital assistant which becomes the device can set a priority degree for power supply to each power supply destination so that each device can receive supply of power from the power supply source in accordance with its priority degree. Therefore, the convenience to the user of the device can be enhanced.

It is to be noted that display of information regarding the priority degree for power supply in FIG. 12A or 12B can be carried out normally while the device remains near on the charging surface of the power supply source 1. Further, also it is possible to carry out display of information regarding the priority degree for power supply in FIG. 12A or 12B only when such display is required, for example, when an instruction is accepted through an operation section not shown connected to the control section 25.

Further, while, in the foregoing description, the control section 25 is provided at the succeeding stage to the rectification circuit 23, the arrangement position of the control section 25 is not limited to this. The control section 25 may otherwise be provided at a preceding stage to the rectification circuit 23.

For example, if an ammeter formed using a toroidal coil is provided as a power detection section at a preceding stage to the rectification circuit 23, then the magnitude of power supplied can be detected also at the preceding stage to the rectification circuit 23. Then, if a result of the detection is supplied to the control section 25, then information regarding the priority degree for power supply can be displayed similarly as in the example described hereinabove with reference to FIG. 11.

Others

It is to be noted that, in the embodiments described hereinabove, various electronic apparatus which require charging can be made a device such as a portable telephone set, a portable music player, a portable game machine, a digital still camera, a digital video camera and an electronic notebook.

Further, while, in the embodiments described hereinabove, power is supplied in a contactless fashion by a magnetic field resonance method, the present invention can be applied similarly where power is supplied in a contactless fashion using not only the magnetic field resonance method but also an electric field resonance method and an electromagnetic induction method.

In particular, while, in the case of the magnetic field resonance method, the energy generated by a resonance element is a magnetic field, the energy generated by a resonance element by the electric field resonance method is the intensity of an electric field, and this should be displayed.

Further, in the embodiments described hereinabove, the power supply source includes an excitation element between an AC power supply and a resonance element, and the devices include an excitation element between a resonance element and a rectification circuit. However, the configuration of the power supply source and the devices is not limited to this. If it is possible to deal with the problems of reflection of power and the impedance, then they can be configured without using an excitation element.

As will be recognized by those skilled in the art, various modifications, combinations, sub-combinations and alterations are possible depending on design requirements and other factors and are within the scope of the appended claims or the equivalents thereof.

What is claimed is:

1. A contactless power supply apparatus that emits AC power using magnetic field resonance, comprising:

an AC power supply to generate an AC current;

at least one circuit to generate a magnetic field from the AC current generated by the AC power supply;

a charging surface to charge at least one device in physical proximity thereto using magnetic field resonance according to the magnetic field generated by the at least one circuit; and a plurality of predetermined shapes concentrically arranged on the charging surface to indicate a charging priority relative to a center of the charging surface according to a magnetic field strength of the magnetic field.

2. The contactless power supply apparatus according to claim 1, wherein an innermost predetermined shape of the plurality of predetermined shapes indicates a highest charging priority.

3. The contactless power supply apparatus according to claim 1, wherein an outermost predetermined shape of the plurality of shapes indicates a highest charging priority.

4. The contactless power supply apparatus according to claim 1, wherein the predetermined shapes are a same shape.

5. The contactless power supply apparatus according to claim 3, wherein the predetermined shapes are one of circles and squares.

6. The contactless power supply according to claim 1, wherein the plurality of predetermined shapes include a plurality of color regions concentrically arranged on the charging surface.

7. The contactless power supply according to claim 6, wherein an innermost color region indicates a highest charging priority.

8. The contactless power supply according to claim 6, wherein an outermost color region indicates a highest charging priority.

9. The contactless power supply according to claim 1, wherein the plurality of predetermined shapes include vertically offset regions arranged on the charging surface, the charging priority being indicated based on a vertical offset of the vertically offset regions.

10. The contactless power supply according to claim 1, wherein the plurality of predetermined shapes include at least a first region of the charging surface formed of a first material and a second region of the charging surface formed of a second material, the charging priority being indicated based on a region material.

11. The contactless power supply according to claim 1, wherein the at least one circuit includes a resonance element to output the magnetic field corresponding to an induced AC current induced therein; and an excitation element coupled to the resonance element by electromagnetic induction, the excitation element inducing the induced AC current in the resonance element based on the AC current generated by the AC power supply.

12. A contactless power supply apparatus that emits AC power using magnetic field resonance, comprising:

means for generating an AC current;

means for generating a magnetic field based on the AC current;

means for charging at least one device using magnetic field resonance according to the generated magnetic field; and means for concentrically indicating a charging priority relative to the means for charging according to a magnetic field strength of the magnetic field.

13. The contactless power supply according to claim 12, wherein the means for indicating includes means for indicating the charging priority based on color.

14. The contactless power supply according to claim 12, wherein the means for indicating includes means for indicating the charging priority on a display of the at least one device.

15. The contactless power supply according to claim 12, wherein the means for indicating includes means for indicating the charging priority based on a material.

16. The contactless power supply according to claim 12, wherein the means for indicating includes means for indicating the charging priority based on vertical offset.

17. A charging system that charges by magnetic field resonance, comprising:

a contactless power supply including an AC power supply to generate an AC current, a circuit to generate a magnetic field based on the AC current, and a charging surface to charge at least one device in physical proximity thereto using magnetic field resonance according to the magnetic field; and a device to be charged including at least one indicator, displayed on a display of the device, to concentrically indicate a charging priority relative to a center of the charging surface according to a magnetic field strength of the magnetic field generated by the circuit.

* * * * *